Jan. 18, 1949.                R. G. KRASBERG                2,459,436
                                HOSE CLAMP
                            Filed Dec. 22, 1945
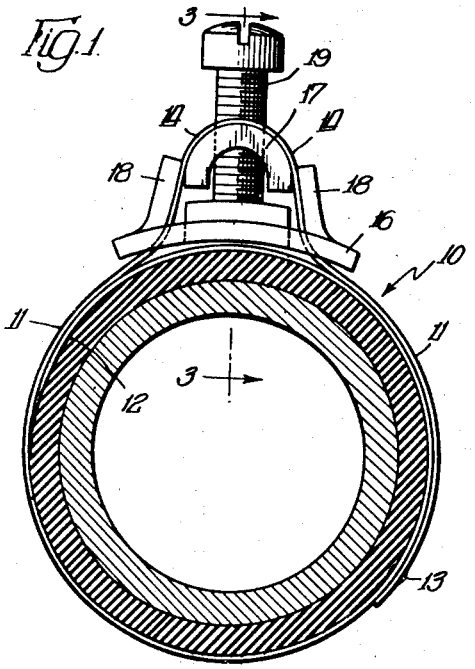
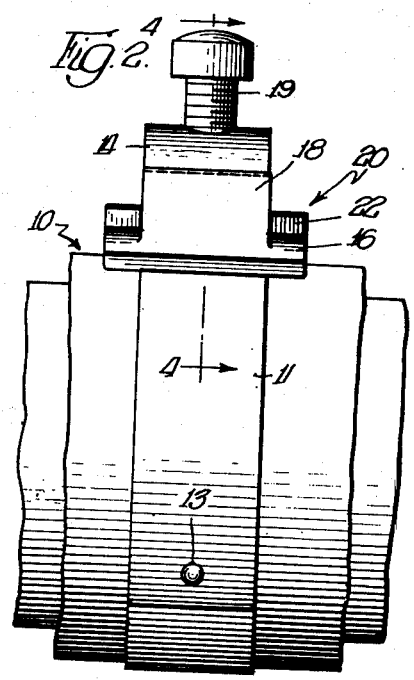
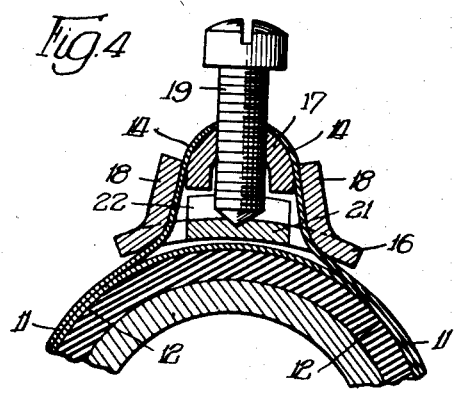
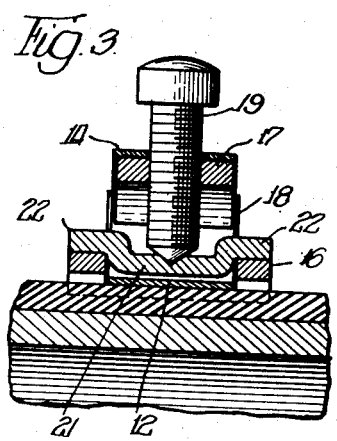
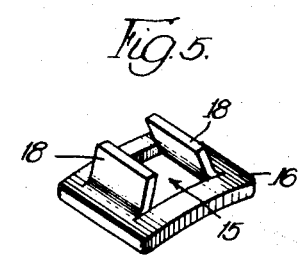
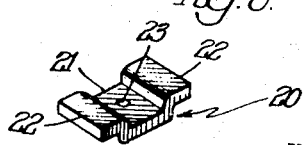
INVENTOR.
Rudolf G. Krasberg,
BY
Cromwell, Greist & Warden
ATTYS.

Patented Jan. 18, 1949

2,459,436

UNITED STATES PATENT OFFICE 2,459,436

HOSE CLAMP

Rudolf G. Krasberg, Chicago, Ill.

Application December 22, 1945, Serial No. 636,591

6 Claims. (Cl. 24—19)

This invention relates to improvements in clamps, having particular reference to heavy duty hose clamps in which a hose area underlying the banding member of the clamp can be subjected to equalized circumferential pressure by contact with the banding member only, by means of a novel arrangement of associated clamping parts, and the provision of such a clamp is a principal object of the invention.

More specifically, it is an object of the invention to provide a hose clamp having a connected circular banding member with overlapping portions, a yoke member having a central opening therethrough, one of the overlapping portions forming a loop which passes through the yoke, and means carried by the loop to draw it through the opening to control the size of the banding member to tighten it against objects to be clamped together and to maintain a substantially continuously circular arrangement of the clamping portion of the banding member in order to bring equalized pressure to bear on objects to be clamped by means of the clamping portion of the banding member only.

Other objects of the invention will in part be obvious and will in part appear hereinafter.

The invention accordingly comprises an article of manufacture possessing the features, properties, and the relation of elements which will be exemplified in the article hereinafter described and the scope of the application of which will be indicated in the claims.

For a fuller understanding of the nature and objects of the invention, reference should be had to the following detailed description taken in connection with the accompanying drawing in which:

Fig. 1 is an end elevational view of a clamp illustrating the present invention;

Fig. 2 is a side elevational view of the clamp depicted in Fig. 1;

Fig. 3 is a sectional view of the clamp tightening means taken along the lines 3—3 of Fig. 1;

Fig. 4 is a sectional view of the same means taken along the lines 4—4 of Fig. 2;

Fig. 5 is a perspective view of a loop guiding yoke member which is one of the parts of the clamp tightening means; and Fig. 6 is a perspective view of a bridging member which is also one of the parts of the clamp tightening means.

Referring now more particularly to the drawing, there is indicated generally at 10 a preferred form of a hose clamp embodying the invention formed from a single strip of metal of any suitable width. Overlapping portions 11 and 12 provide a continuous circular banding member. The overlapping portions are preferably permanently secured together, for example, by means of a rivet 13.

The overlapping portion 11 is formed into a loop 14. This loop passes through an opening 15 in a yoke 16. The yoke has oppositely disposed upstanding loop guiding fingers 18.

The upper part of the loop 14 has an appropriate opening therein. Underlying this opening and within the loop is a preferably semi-circular loop drawing member, or nut, 17. Passing through the opening in the loop and member 17 is a screw 19. The ends of the loop drawing member preferably are each disposed substantially opposite of one of the guide fingers 18 with the loop 14 passing therebetween.

Also disposed within the loop 14 and carried by the yoke 16 is a bridging member, or thrust piece, indicated generally at 20, preferably having a centrally depressed body portion 21 and wing portions 22 extending laterally therefrom. The depressed portion fits into the opening 15 in the yoke 16 within the loop 14. It is important that the bridging member or thrust piece 20 does not contact the overlapped portion 12 of the banding member but must be sufficiently spaced therefrom to prevent any binding action when the device is in operation.

The screw 19 preferably terminates in a point and fits into a detent 23 in the depressed portion 21 of the bridging member 20. Upon being tightened the screw 19 will thrust against the bridging member 20. It should be noted that the tail piece of the overlapped portion 12 extends underneath the loop 14 and yoke 16 to a point preferably approximately diagonally opposite the point at which the overlapping band portions 11 and 12 are secured together by the rivet 13.

With this arrangement of parts the banding member can be kept in circular formation during operation. When the screw is tightened the banding member is decreased in size and the loop 14 is increased in size as it is drawn through the yoke 16. A wide size range for objects to be clamped together can thus be accommodated, depending upon the length of the screw 18 and the allowance provided by the overlapped portion 11. It is important to note that as the screw is tightened, the banding member tends to maintain a perfect circle. In this way equalized pressure is brought to bear at all points, for example, against resilient members, such as hoses telescoped by a pipe underlying the banding member and a perfect sealing arrangement can be obtained.

The tail piece of the overlapped portion 12 will at all times be maintained in position. By means of this arrangement the parts which are to be clamped together are contacted only by the metal strip constituting the banding member.

It will thus be seen that the objects hereinbefore set forth may readily and efficiently be attained, and since certain changes may be made in the above article and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A clamp, which comprises a circular banding member having overlapping portions, a yoke member having a central opening therethrough, one of said overlapping portions forming a loop which passes through the opening in said yoke, and means carried by said loop and held in spaced relation with respect to said other overlapping portion to draw the loop through said opening to decrease the size of said banding member to tighten the same against objects to be clamped together, and to maintain the circular arrangement of said banding member whereby to bring equalized pressure to bear on objects to be clamped by said banding member only.

2. A clamp, which comprises a banding member having overlapping portions, a yoke member having a central opening therethrough, one of said overlapping portions forming a loop which passes through the opening in said yoke, the other overlapping portion forming a tail piece which passes underneath said yoke, and means carried by said loop and held in spaced relation with respect to said other overlapping portion to draw the loop through said opening to decrease the size of said banding member to tighten the same against objects to be clamped together, and to maintain the circular arrangement of said banding member whereby to bring equalized pressure to bear on objects to be clamped by said banding member only.

3. A clamp, which comprises a circular banding member having overlapping portions secured together, a yoke member having a central opening therethrough, one of said overlapping portions forming a loop which passes through the opening in said yoke, the other overlapping portion forming a tail piece which passes underneath said yoke, and means, including a bridging member overlying the opening in said yoke and in spaced apart relation with respect to said tail piece, carried by said loop to draw the loop through said opening to decrease the size of said banding member to tighten the same against objects to be clamped together, and to maintain the circular arrangement of said banding member whereby to bring equalized pressure to bear on objects to be clamped by said banding member only.

4. A clamp, which comprises a circular banding member having overlapping portions secured together, a yoke member having a central opening therethrough, one of said overlapping portions forming a loop which passes through the opening in said yoke, the other overlapping portion forming a tail piece which passes underneath said yoke, and means, including a bridging member having a centrally depressed portion extending into the opening in said yoke and wing portions extending laterally from said depressed portion and supporting the bridging member on said yoke and in spaced apart relation with respect to said tail piece, carried by said loop to draw the loop through said opening to decrease the size of said banding member to tighten the same against objects to be clamped together, and to maintain the circular arrangement of said banding member whereby to bring equalized pressure to bear on objects to be clamped by said banding member only.

5. A clamp, which comprises a circular banding member having overlapping portions secured together, a yoke member having a central opening therethrough, one of said overlapping portions forming a loop which passes through the opening in said yoke, the other overlapping portion forming a tail piece which passes underneath said yoke, and means, including a substantially semi-circular loop drawing member and a bridging member, carried by said loop and abutting the same to draw said loop through said opening to decrease the size of said banding member to tighten the same against objects to be clamped together, and to maintain the circular arrangement of said banding member whereby to bring equalized pressure to bear on objects to be clamped by means of said banding member only.

6. A device of the kind described, which comprises a circular banding member having overlapping portions secured together, a yoke member having a central opening therethrough and being provided with upwardly directed loop guiding fingers, one of said overlapping portions forming a loop which passes through the opening in said yoke, the other overlapping portion forming a tail piece which passes underneath said yoke, and means, including a bridging member a substantially semi-circular loop drawing member having its end portions disposed opposite one of said guiding fingers with said loop therebetween, carried by said loop to draw it through said opening to decrease the size of said banding member to tighten the same against objects to be clamped together, and to maintain the circular arrangement of said banding member whereby to bring equalized pressure to bear on objects to be clamped by said banding member only.

RUDOLF G. KRASBERG.

REFERENCES CITED

The following references are of record in the file of this patent:

UNITED STATES PATENTS

| Number | Name | Date |
|---|---|---|
| 1,412,189 | Lopdell | Apr. 11, 1922 |
| 2,335,464 | Finnerman | Nov. 30, 1943 |